(12) United States Patent
Al-Anzi

(10) Patent No.: US 8,413,968 B2
(45) Date of Patent: Apr. 9, 2013

(54) WATER AERATION CAPSULES

(76) Inventor: Bader Shafaqa Al-Anzi, Safat (KW)

( * ) Notice: Subject to any disclaimer, the term of this patent is extended or adjusted under 35 U.S.C. 154(b) by 48 days.

(21) Appl. No.: 13/219,561

(22) Filed: Aug. 26, 2011

(65) Prior Publication Data

US 2013/0049237 A1 Feb. 28, 2013

(51) Int. Cl.
*B01F 3/04* (2006.01)
(52) U.S. Cl.
USPC ..... 261/120; 261/121.1; 210/758; 210/221.2; 210/242.2
(58) Field of Classification Search .......... 261/120, 261/121.1, 124, 125; 210/221.2, 242.2, 695, 210/758
See application file for complete search history.

(56) References Cited

U.S. PATENT DOCUMENTS

| | | | |
|---|---|---|---|
| 4,155,868 A | 5/1979 | Kaplan et al. | |
| 5,587,191 A | 12/1996 | Donsbach et al. | |
| 5,695,635 A * | 12/1997 | Sasaki et al. | 210/188 |
| 5,906,745 A * | 5/1999 | Eto | 210/601 |
| 6,086,056 A * | 7/2000 | Leask et al. | 261/120 |
| 6,284,293 B1 | 9/2001 | Crandall et al. | |
| 6,485,229 B1 * | 11/2002 | Gunderson et al. | 405/63 |
| 7,390,418 B2 | 6/2008 | Martin et al. | |
| 8,292,271 B2 * | 10/2012 | Fujisato et al. | 261/116 |

FOREIGN PATENT DOCUMENTS

CA 1100243 4/1981

OTHER PUBLICATIONS

Website, http://www.eco-tabs.com/index.html, wastewater treatment tablets, one sheet printed from the internet on Mar. 11, 2011.
Website, http://www.letstalkhealth.com/Oxygen-Capsules-p/156.htm, food grade hydrogen peroxide capsules, three sheets printed from the internet on Mar. 11, 2011.
Website, http://www.metamind.net/oxycaps.html, stabilized oxygen capsules, one sheet printed from the internet on Mar. 11, 2011.

* cited by examiner

*Primary Examiner* — Charles Bushey
(74) *Attorney, Agent, or Firm* — Richard C. Litman

(57) ABSTRACT

The water aeration capsules provide a quick and highly portable system for aerating polluted water. The capsules contain bubbles of air, oxygen, and/or other gas(es) surrounded by a water soluble shell or membrane of a suitable substance, e.g., various salts, sugars, water-soluble polymers, such as polyvinyl alcohol. The capsules are ballasted to make their specific gravity greater than the water they displace. The ballast may comprise any non-toxic metal, sand, clay, or other non-organic material, and/or fish bait or other food for aquatic animals. Magnetically attractive ballast elements may be provided, and a magnetic sheet may be placed on the bottom of a smaller body of water to enhance the settling of the capsules. Various means of dispensing the capsules from various mobile carriers are also disclosed, including dispensing by hand from shore or by a diver, from a small boat or larger ship, and/or from aircraft.

19 Claims, 5 Drawing Sheets

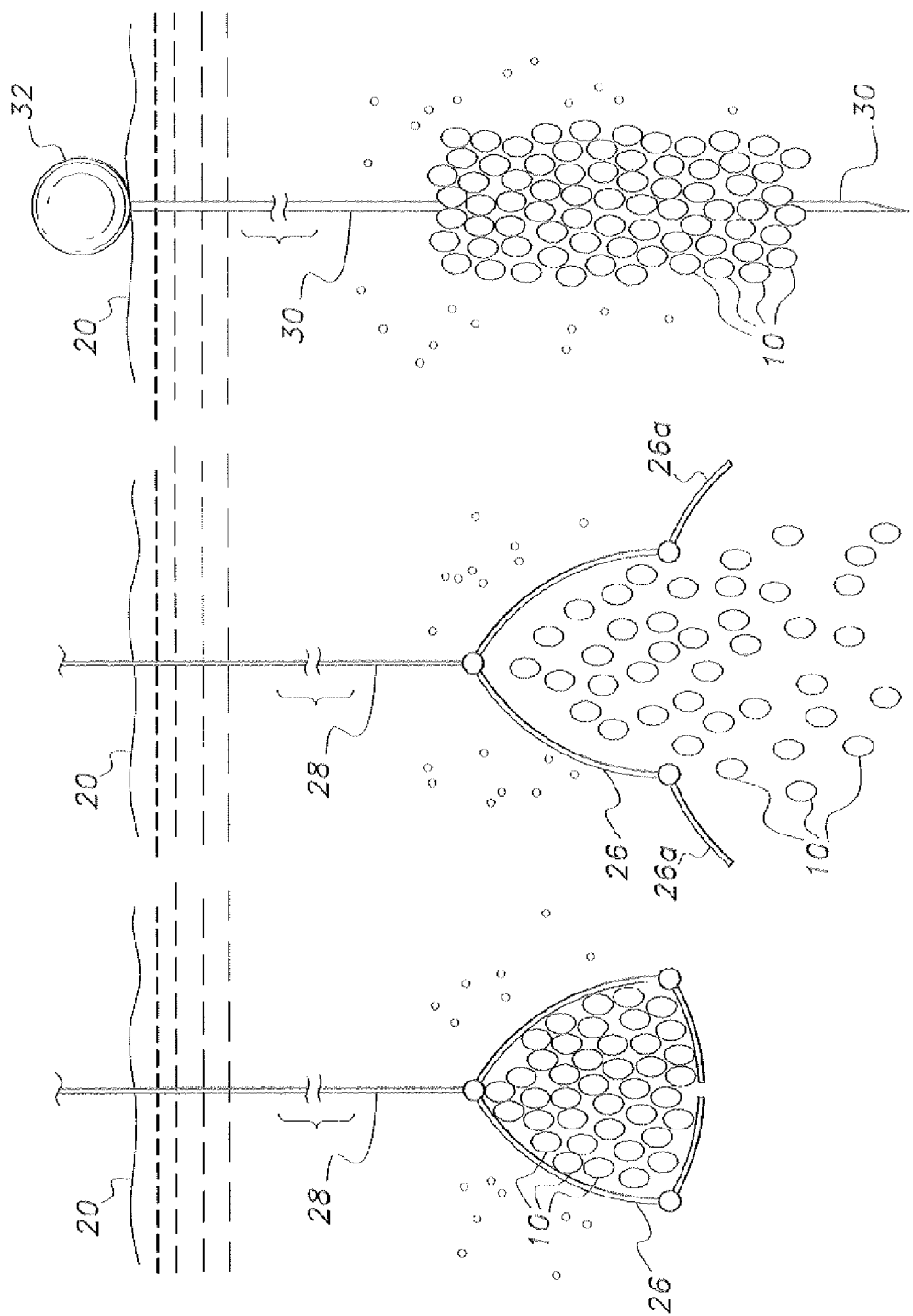

WATER AERATION CAPSULES

BACKGROUND OF THE INVENTION

1. Field of the Invention

The present invention relates generally to water treatment systems, and particularly to various embodiments of water aeration capsules and dispensing means therefor.

2. Description of the Related Art

The contamination of various bodies of water by various means is an increasingly serious problem worldwide. Perhaps the most widespread contaminants are organic materials that enter the water system due to pollution from human habitation either directly or indirectly, e.g., pollution from farms and the like. Such pollution can affect inland fresh water supplies (lakes and rivers), and can also be carried to the sea by inland rivers and waterways or by direct discharge of sewage and/or other pollutants into the sea. Organic material in the sewage of treatment plants is another example of such pollution, albeit contained for processing. The biochemical processes that occur in water due to such organic pollution are well known to decrease the oxygen content of the water, thereby reducing or perhaps even destroying fish and other aquatic life in the contaminated body of water. Even if some fish remain in the polluted water, they are almost certainly unfit for human consumption if caught.

It is generally considered that the most effective means of eliminating such pollutants in contaminated water is by bacteriological processing, wherein bacteria process the contaminants to break them down into harmless organic materials. However, such bacteria are aerobic, i.e., they require oxygen for their metabolism. This is well known in the sewage treatment field, where water is commonly treated by aeration after solids are removed by settling or other means. Such aeration is generally accomplished by mechanical means, e.g., pumping the water up for dispensing into the air from spray booms and nozzles, or perhaps by forcing air through underwater pipes for the air to bubble up through the water. Such mechanical systems are relatively costly to operate and require relatively high energy and manpower costs. Even if such systems were less costly to operate, a huge drawback is that they cannot be readily transported to a pollution site for operation at that site. Rather, the water must be transported to the location of the aeration system, a process that is clearly unworkable on a very large scale and/or over very long distances.

Thus, water aeration capsules solving the aforementioned problems are desired.

SUMMARY OF THE INVENTION

The water aeration capsules comprise several embodiments of water soluble capsules containing oxygen, air, and/or other gas(es) therein. The capsules may be formed to have any practicable shape or configuration. The gas impervious outer shell, skin, or membrane is formed of a water soluble material, such as various salts, sugars, and/or water soluble polymers, e.g., various polyvinyl alcohols, and numerous other conventional materials and substances. Regardless of the specific shape or configuration of the capsules and/or the material used to form the outer shell or skin, all of the capsules include some form of ballast material, resulting in the capsules having negative net buoyancy, i.e., a capsule specific gravity greater than one. The ballast material may comprise any of a number of different materials, so long as the specific gravity of the ballast material is greater than one. Examples of such ballast material are various non-toxic metals, sand, clay, and/or fish bait or other food for aquatic animals. The use of such aquatic animal food as ballast provides a twofold benefit for the capsules, in that (1) it causes the capsules to sink, and (2) provides nutrition for aquatic animal life in the treated body of water, once the capsules have dissolved.

Various means for dispensing the capsules, or enhancing their dispensing, are also disclosed herein. At least one embodiment comprises magnetically attractive ballast elements in the capsules, and a magnetic plate, grid, or the like placed in the bottom of the body of water being treated. Such a system is well suited for use in smaller and shallower ponds, such as sewage treatment ponds or relatively small contaminated bodies of open water. The magnetic sheet placed at the bottom of the pond during operation may be recovered after the aeration process has been completed, thus also recovering the magnetically attractive ballast elements therewith. The capsules may be dispensed by any practicable means by a mobile carrier, e.g., one or more persons dispensing the capsules by hand from the shore, a boat, or by underwater diving, or perhaps on a larger scale from a ship(s) or aircraft.

These and other features of the present invention will become readily apparent upon further review of the following specification and drawings.

BRIEF DESCRIPTION OF THE DRAWINGS

FIG. 3A is a diagrammatic environmental elevation view showing a plurality of water aeration capsules according to the present invention, contained within a remotely actuated dispensing device.

FIG. 3B is a diagrammatic elevation view of the dispensing device of FIG. 3A, showing the release and dispersal of the water aeration capsules from the opened dispensing device.

FIG. 4 is an environmental elevation view of a plurality of water aeration capsules according to the present invention, disposed on an alternative dispensing device and mobile carrier therefor.

Similar reference characters denote corresponding features consistently throughout the attached drawings.

DETAILED DESCRIPTION OF THE PREFERRED EMBODIMENTS

Figure 1A:
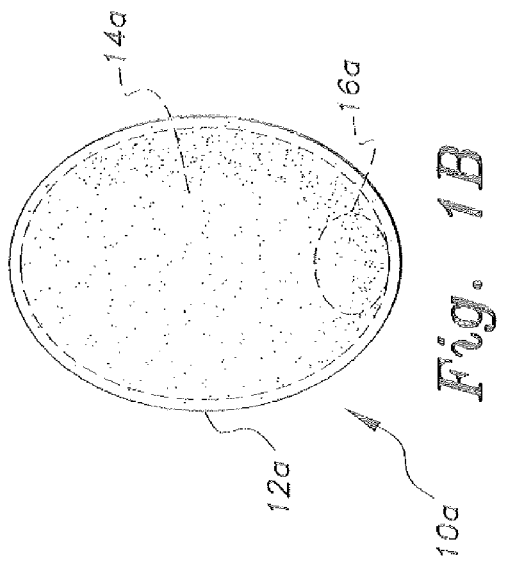
FIG. 1A is a front view in section of a first embodiment of a water aeration capsule according to the present invention, illustrating its internal structure.
Figure 1B:
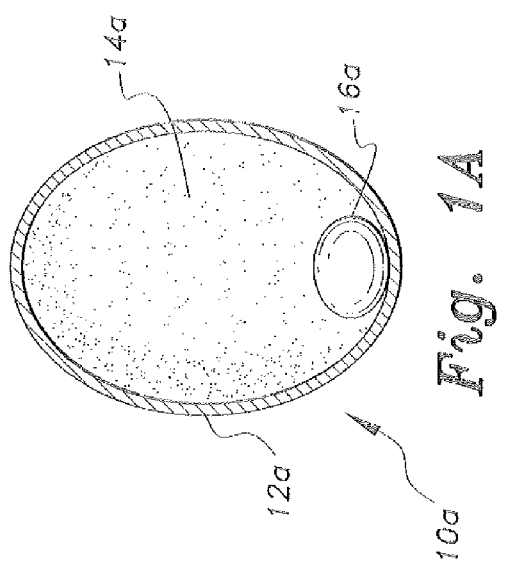
FIG. 1B is a front view of the water aeration capsule of FIG. 1, illustrating its external structure.
Figure 1C:
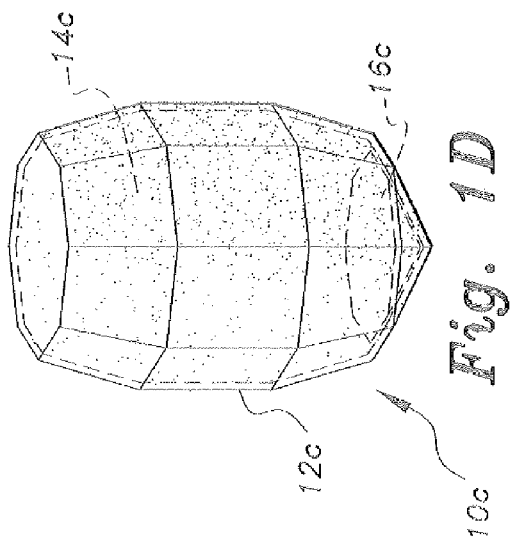
FIG. 1C is a top perspective view of a second embodiment of a water aeration capsule according to the present invention, illustrating its external structure.
Figure 1D:
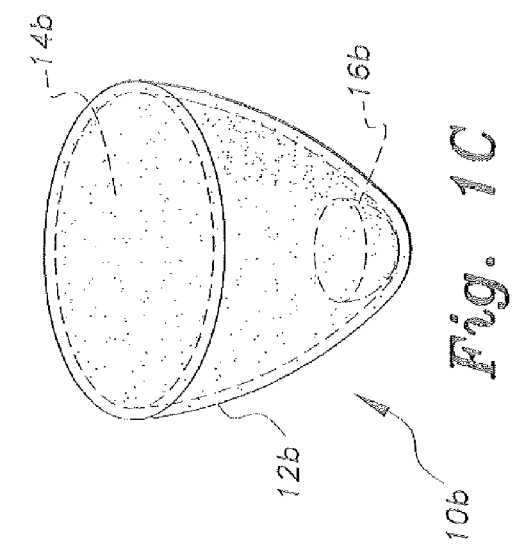
FIG. 1D is a perspective view of a third embodiment of a water aeration capsule according to the present invention, illustrating its external structure.

The water aeration capsules comprise several different configurations of capsules that are each adapted for treating a body of water with air, oxygen, and/or other gas(es). FIGS. 1A and 1B of the drawings provide a front view in section and a front view of a first embodiment of a water aeration capsule 10a, while FIGS. 1C and 1D illustrate alternative embodiment capsules 10b and 10c. The only difference between the various capsules 10a, 10b, and 10c is their shape or geometric configuration, the basic structure comprising a closed shell surrounding an internal volume containing a gas and a ballast weight or element therein, which is the same for all of the various configurations or embodiments of the capsule.

The capsule 10a comprises a thin, closed water soluble shell, skin or membrane 12a, defining a gas-filled internal volume 14a. A ballast element 16a is placed within the internal volume, the ballast element having sufficient mass to result in a collective specific gravity greater than one for the entire capsule 10a and its gas-filled interior, i.e., the capsule 10a will sink when dropped into a body of water. The corresponding water aeration capsules 10b of FIGS. 1C and 10e of FIG. 1D have substantially the same structure, differing only in their geometric shapes. The capsule 10b of FIG. 1C includes a shell, skin, or membrane 12b enclosing a gas-filled volume 14b and a ballast element 16b, while the capsule 10c of FIG. 1D includes a shell, skin, or membrane 12c enclosing a gas-filled volume 14c and a ballast element 16c. The shapes of the various water aeration capsules 10a through 10c are exemplary, and it should be understood that virtually any practicable shape may be used to form such a water aeration capsule.

The capsule shell, skin or membrane 12a (or 12b, 12c for the capsules 10b, 10c of FIGS. 1C, 1D) may be formed of any suitable water soluble material that is substantially impervious to the gas contained therein until dissolved in water. Various salts, sugars, and/or water soluble polymers, such as polyvinyl alcohol or the like, may be used to form the outer shell or skin 12a. All of these substances are conventional, and accordingly no further disclosure need be provided. It should be understood that the above-listed materials for forming the shell or membrane 12a of the capsule 10a are exemplary, and other suitable conventional water soluble materials may be used in lieu thereof. The capsule shell, membrane or skin may be flexible or brittle, depending upon the material(s) used. If brittle materials are used, the shell may break or be crushed by water pressure at relatively deep levels, but this is certainly acceptable as it will release the air or other gas contained therein, the broken portions of the shell dissolving later. Generally, the capsule membrane, skin, or shell has insufficient strength to contain air or gas at much higher than ambient pressure, but the air or gas may be placed within the capsule at somewhat higher than ambient pressure (i.e., a pressurized capsule), if the shell, skin or membrane has sufficient strength.

The intended purpose of the water aeration capsule 10a, and other capsule embodiments, is to treat a body of contaminated or polluted water with oxygen in order to promote the growth of desirable bacteria that, in turn, process the pollutants in the water, changing the processed pollutants to less harmful organic materials. Accordingly, a preferred gas with which the capsules 10a (or 10b, 10c, etc) may be filled is oxygen, but standard air (approximately 21% oxygen and 78% nitrogen, with traces of other gases) may be used economically. It will be understood that the terms "aerate" and "aeration" as used herein are intended to describe the release of any practicable gas within a body of water by means of the aeration capsules described herein. Other gases, e.g., carbon dioxide, pure nitrogen, hydrogen, and/or inert gases such as helium, argon, and neon, may be used in lieu of or in addition to oxygen or air as desired for purposes other than oxygenating the water. The principle of encapsulating a gas and ballasting the capsule to cause it to sink in a body of water and then dissolve to release the gas remains the same for any gas contained in the capsule.

Figure 8:
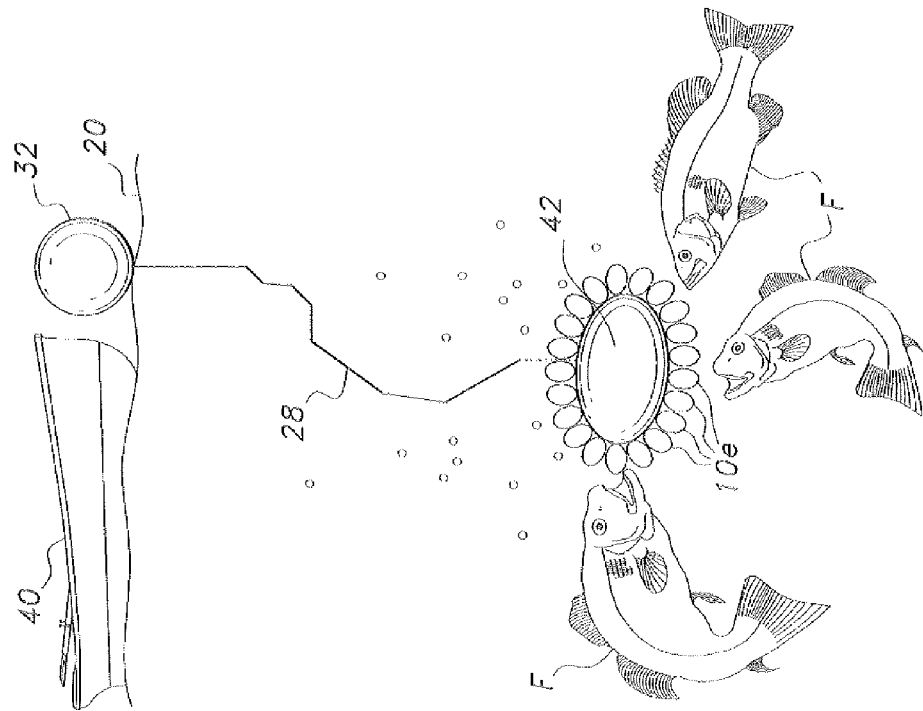
FIG. 8 is an environmental elevation view showing a plurality of water aeration capsules according to the present invention, another alternative dispensing device, and another alternative mobile carrier.

The ballast weight or element 16a (or 16b, 16c, etc.) may be formed of any suitable material, so long as it provides sufficient mass to cause its respective capsule to sink in a body of water. The ballast element may be made from very common and inexpensive materials, e.g., a non-toxic metal(s) such as iron, steel, copper, brass, etc., or non-metallic materials, such as sand, clay, ceramic pellets or stone or gravel, etc. Another alternative is to use some form of food for aquatic animals as the ballast means. Such an embodiment is illustrated in FIG. 8 and discussed further below.

Figure 2:
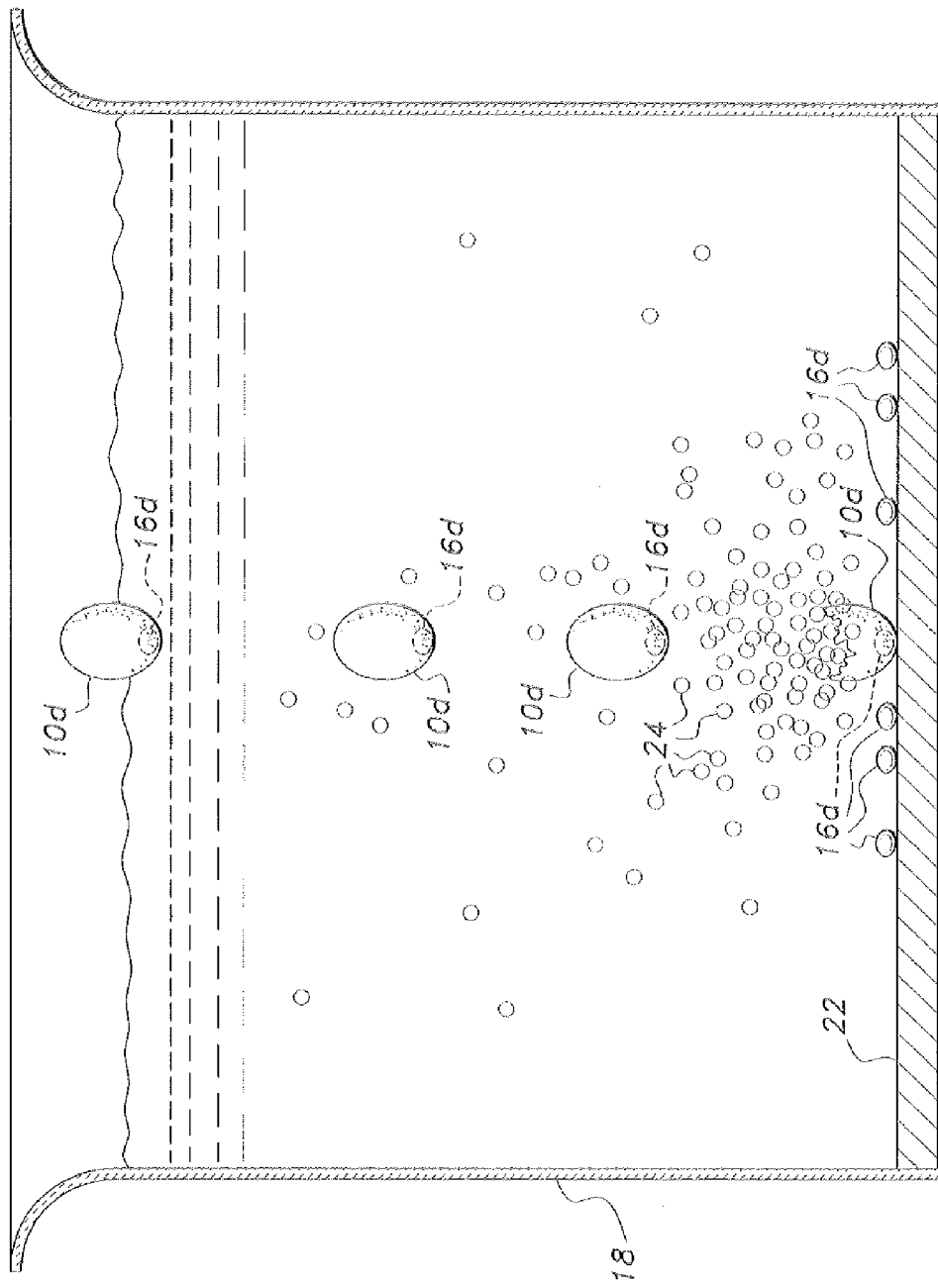
FIG. 2 is an environmental elevation view of a plurality of magnetically attractive water aeration capsules according to the present invention being dispensed into a body of water having a magnetic plate at the bottom thereof, showing progressive dissolution of the capsules in the body of water.

FIG. 2 provides an illustration of a water aeration capsule 10d having an alternative ballast weight or element 16d therein formed of a magnetically attractive material, e.g., ferromagnetic iron, steel, etc. A container 18 containing water 20 therein, an aquarium or fish tank, includes a magnetically attractive sheet 22 in the bottom thereof. The magnetically attractive sheet may be in the form of a plate, as shown, or a grid or thin sheet of material. The magnetically attractive sheet 22 may be electromagnetically activated, if sufficient electrical insulation is provided for the device. Otherwise, latent magnetism of the magnetized sheet 22 will suffice. The principle illustrated in FIG. 2 may be applied to small natural or man-made bodies of water as well, with the beaker-like container 18 merely being exemplary as a demonstration of the principle.

The capsules 10d may be deployed or dispensed into the water 20 in any conventional manner. In the case of a small container of water, or even a relatively small pond or narrow body of water, the capsules 10d (and others described herein) may be deployed by hand by personnel on shore. As the capsules 10d and their magnetically attractive ballast elements 16d approach the bottom of the container 18 as they sink, their magnetic ballast elements 16d are attracted to the magnetic plate or sheet 22 in the bottom of the container 18, thereby increasing the sink rate of the capsules 10d to better assure that the capsules will reach the bottom of the container 18 before being breached and releasing the gas 24 contained therein. The magnetic sheet 22 may be recovered after the body of water 20 has been aerated, the magnetically attractive ballast elements 16d clinging magnetically to the sheet 22 for recovery and reuse.

FIGS. 3A and 3B illustrate an exemplary means of releasing a relatively large number of water aeration capsules in a larger body of water, e.g., larger pond, lake, ocean, river, etc. A mobile carrier comprising a remotely openable container 26 is provided and filled with water aeration capsules 10. (The generic reference numeral 10 will be used to designate the water aeration capsules of FIGS. 3A through 7, as the capsules 10 may be of any of the configurations illustrated in FIGS. 1A through 2, or any other desired configuration.) The container 26 may be a wire basket or the like, or may be formed of unbroken panels. It is not necessary to protect the capsules 10 contained therein, as the intent is for them to dissolve in the water once they have been submerged. The mobile carrier or container 26 is lowered into the water 20 on a rope, cable, chain, or other extended element 28, to the depth desired. When the container 26 has reached the desired depth, the lower doors or panels 26a may be opened remotely by conventional means, e.g., a secondary mechanical rope, cable, or line, or via an electrical signal or radio signal to the appropriate conventional actuation mechanism on or in the container 26. When the doors or panels 26a are opened, as shown in FIG. 3B, the capsules 10 are released to dissolve in the water 20 to release their aeration gases.

FIG. 4 provides an illustration of another alternative means for deploying the capsules 10 in the water 20. In this embodiment, the mobile carrier comprises a stick, rod, or the like 30 suspended from a float or buoy 32. (It will be seen that the container 26 of FIGS. 3A and 3B may be suspended from the rod and float of FIG. 4, if desired.) The capsules 10 of FIG. 4 are not contained within an enclosure, but are adhesively secured to the stick or rod 30 and to one another by water soluble adhesive, e.g., by wheat flour paste, etc. Alternatively, they may be gathered on the stick or rod 30 by a porous fabric or wire mesh or screen (not shown) surrounding the capsules. The stick or rod 30 arrangement has the advantage of simplicity in that no remote actuation of container doors or the like is required for the release of the capsules 10.

Figure 6:
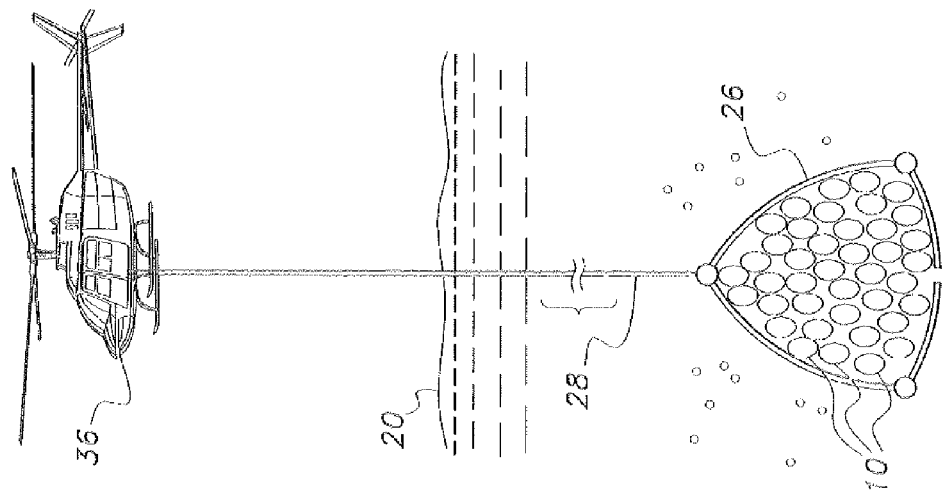
FIG. 6 is an environmental elevation view showing the water aeration capsules and dispensing device of FIG. 3A, and another alternative mobile carrier.
Figure 5:
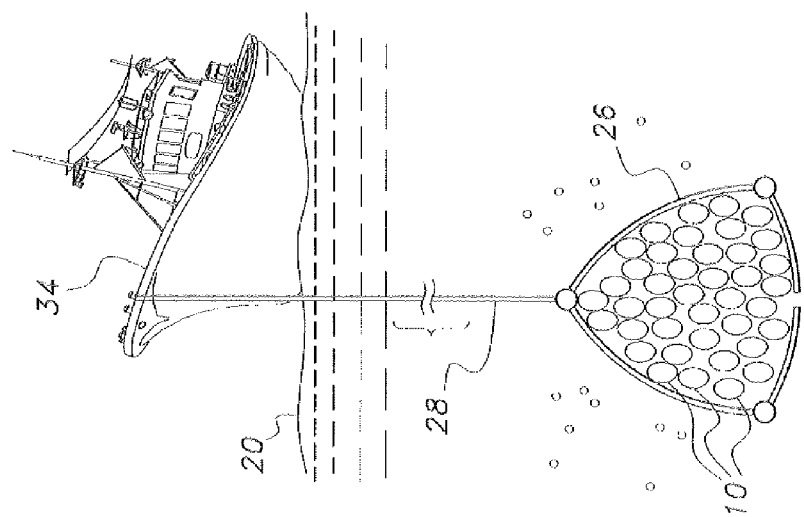
FIG. 5 is an environmental elevation view showing the water aeration capsules and dispensing device of FIG. 3A, and an alternative mobile carrier.
Figure 7:
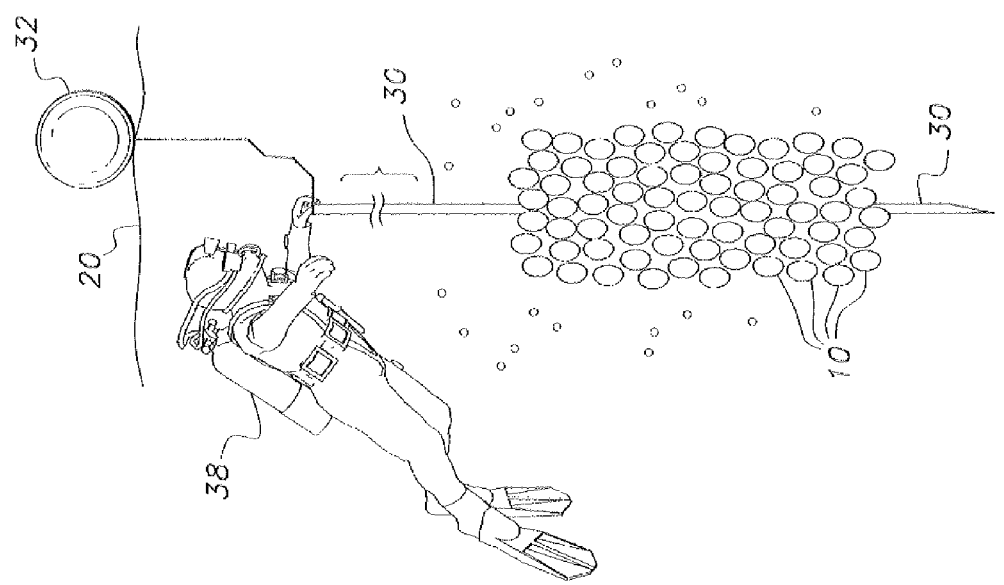
FIG. 7 is an environmental elevation view showing the water aeration capsules and dispensing device of FIG. 4, and another alternative mobile carrier.

FIGS. 5 through 7 provide illustrations of various alternative means for dispensing or deploying the water aeration capsules 10 (or other capsule embodiments 10a, 10b, etc.). In FIG. 5, a mobile carrier comprising a ship 34 is used to lower a container 26 into the water 20 by means of a rope, cable, or other line 28. The operation of the container 26 is essentially as described further above for the embodiment of FIGS. 3A and 3B. In FIG. 6, a rotary wing aircraft, e.g., helicopter 36, is used as the mobile carrier, and the aeration capsule container 26 and line 28 are essentially the same as that shown in FIGS. 3A, 3B, and 5. It will be recognized that a conventional fixed wing aircraft (not shown) may be used as the mobile carrier in lieu of the helicopter 36 of FIG. 6. In FIG. 7, a scuba diver 38 is used as the mobile carrier, along with the rod or stick 30 and float or buoy 32 illustrated in FIG. 4. Such a deployment method might be desirable in certain bodies of water not accessible by larger craft.

FIG. 8 illustrates yet another embodiment wherein a small boat 40 is used to position a float or buoy 32 having a plurality of water aeration capsules 10e suspended from the lower end of a cable, rope, or line 28. The capsules 100 may be adhesively secured to a central carrier 42 by means of water soluble adhesive, as described further above for the embodiment of FIG. 4. The capsules 10e are designated differently than the capsules 10 through 10d of earlier described embodiments, as they utilize an aquatic animal food for their ballast elements. Initially, fish F and other forms of aquatic animal life will not be attracted to the capsules 10e until they are breached to release their aquatic animal food ballast. However, once at least some of the capsules 10e are breached in some manner (dissolution in the water, fracturing under pressure, etc.), the scent of the aquatic animal food ballast will be released, thereby attracting fish F and/or other forms of aquatic animal life as may be present. Thus, the capsules 10e provide the twofold function of aerating the water and also providing nutrition for any aquatic animal life that may be present when the capsules 10e are breached, both of these functions benefiting the population of aquatic animal life in the area.

It is to be understood that the present invention is not limited to the embodiments described above, but encompasses any and all embodiments within the scope of the following claims.

I claim:

1. Water aeration capsules for treating a body of water, each of the capsules comprising:
    a thin, closed water soluble shell defining an internal volume;
    a gas disposed within the internal volume of the shell; and
    a ballast element disposed within the internal volume of the shell, the ballast element, the shell, and the gas in combination having a collective specific gravity greater than one.

2. The water aeration capsules according to claim 1, wherein the ballast element is formed of magnetically attractive material, the water aeration capsules further comprising a magnetically attractive sheet disposed upon the bottom of the body of water being treated.

3. A method of aerating water using the water aeration capsules of claim 1, comprising the steps of:
    (a) providing a plurality of aeration capsules, each of the capsules having a water soluble shell containing a volume of gas therein;
    (b) ballasting each of the aeration capsules to a specific gravity greater than one;
    (c) dispensing the aeration capsules in the body of water from a mobile carrier; and
    (d) allowing the water soluble shells of the aeration capsules to dissolve in the body of water, thereby releasing the gas from the aeration capsules into the body of water.

4. The method of aerating a body of water according to the method of claim 3, wherein the step of dispensing the aeration capsules in the body of water from a mobile carrier further comprises the step of selecting the mobile carrier from the group of mobile carriers consisting of onshore personnel, scuba divers, floats, boats, ships, fixed wing aircraft, and rotary wing aircraft.

5. The water aeration capsules according to claim 1, wherein the water soluble shell is formed of materials selected from the group consisting of salts, sugars, and water soluble polymers.

6. The water aeration capsules according to claim 1, wherein the gas is selected from the group of gases consisting of air, oxygen, nitrogen, hydrogen, carbon dioxide, and inert gases.

7. The water aeration capsules according to claim 1, wherein the ballast element is selected from the group of ballast elements consisting of non-toxic metals, sand, clay, stone, and aquatic animal food.

8. Water aeration capsules for treating a body of water, each of the capsules comprising:
    a thin, closed water soluble shell defining an internal volume;
    a gas disposed within the internal volume of the shell;
    a magnetically attractive ballast element disposed within the internal volume of the shell, the ballast element, the shell, and the gas in combination having a collective specific gravity greater than one; and
    a magnetically attractive sheet adapted for placement upon the bottom of the body of water being treated in order to attract the ballast element thereto.

9. A method of aerating water using the water aeration capsules of claim 8, comprising the steps of:
    (a) providing a plurality of aeration capsules, each of the capsules having a water soluble shell containing a volume of gas therein;
    (b) ballasting each of the aeration capsules to a specific gravity greater than one;
    (c) dispensing the aeration capsules in the body of water from a mobile carrier; and (d) allowing the water soluble shells of the aeration capsules to dissolve in the body of water, thereby releasing the gas within the aeration capsules in the body of water.

10. The method of aerating a body of water according to the method of claim 9, wherein the step of dispensing the aeration capsules in the body of water from a mobile carrier further comprises the step of selecting the mobile carrier from the group of mobile carriers consisting of onshore personnel, scuba divers, floats, boats, ships, fixed wing aircraft, and rotary wing aircraft.

11. The water aeration capsules according to claim 8, wherein the water soluble shell is formed of materials selected from the group consisting of salts, sugars, and water soluble polymers.

12. The water aeration capsules according to claim 8, wherein the gas is selected from the group of gases consisting of air, oxygen, nitrogen, hydrogen, carbon dioxide, and inert gases.

13. The water aeration capsules according to claim 8, wherein the ballast element further includes supplemental ballast selected from the group of supplemental ballast consisting of non-toxic metals, sand, clay, stone, and aquatic animal food.

14. A method of aerating a body of water, comprising the steps of
  (a) providing a plurality of aeration capsules having a water soluble shell;
  (b) placing a volume of gas within the water soluble shell;
  (c) ballasting each of the aeration capsules to a specific gravity greater than one;
  (d) dispensing the aeration capsules in the body of water from a mobile carrier; and
  (e) allowing the water soluble shells of the aeration capsules to dissolve in the body of water, thereby releasing the gas within the aeration capsules in the body of water.

15. The method of aerating a body of water according to the method of claim 14, further comprising the step of forming the water soluble shell of materials selected from the group consisting of salts, sugars, and water soluble polymers.

16. The method of aerating a body of water according to the method of claim 14, wherein the step of placing a volume of gas within the water soluble shell further comprises selecting the gas from the group of gases consisting of air, oxygen, nitrogen, hydrogen, carbon dioxide, and inert gases.

17. The method of aerating a body of water according to the method of claim 14, wherein the step of ballasting each of the aeration capsules to a specific gravity greater than one further comprises selecting the ballast element from the group of ballast elements consisting of non-toxic metals, sand, clay, stone, and aquatic animal food.

18. The method of aerating a body of water according to the method of claim 14, wherein the step of ballasting each of the aeration capsules to a specific gravity greater than one further comprises the steps of:
  (a) using a magnetically attractive material for the ballast, in each of the aeration capsules; and
  (b) placing a magnetically attractive sheet on the bottom of the body of water.

19. The method of aerating a body of water according to the method of claim 14, wherein the step of dispensing the aeration capsules in the body of water from a mobile carrier further comprises the step of selecting the mobile carrier from the group of mobile carriers consisting of onshore personnel, scuba divers, floats, boats, ships, fixed wing aircraft, and rotary wing aircraft.

* * * * *